Dec. 16, 1952 J. B. COOPER ET AL 2,621,577
CABIN PRESSURE CHANGE CONTROL
Original Filed Oct. 18, 1941 3 Sheets-Sheet 1

Inventors
James B. Cooper
Alfred B. Jepson
By Reynolds + Beach
Attorneys

Dec. 16, 1952  J. B. COOPER ET AL  2,621,577
CABIN PRESSURE CHANGE CONTROL
Original Filed Oct. 18, 1941  3 Sheets-Sheet 2

Inventors
**James B. Cooper
Alfred B. Jepson**
Attorneys

Inventors
Alfred B. Jepson
James B. Cooper
By Reynolds & Beach
Attorneys

Patented Dec. 16, 1952

2,621,577

UNITED STATES PATENT OFFICE 2,621,577

CABIN PRESSURE CHANGE CONTROL

James B. Cooper, Seattle, and Alfred B. Jepson, Bellevue, Wash., assignors to Boeing Airplane Company, Seattle, Wash., a corporation of Delaware Original application October 18, 1941, Serial No. 415,602. Divided and this application October 9, 1948, Serial No. 53,686

25 Claims. (Cl. 98—1.5)

Relation to other devices

The patent to N. C. Price, Reissue 22,272, issued February 16, 1943, discloses a pressure control system and a pressure control device intended to regulate the pressure within an aircraft cabin. In the physical form adopted for illustration in that Price patent, an inflow valve and an outflow valve were employed, with interconnecting controls affecting each of the valves, these controls including an absolute-pressure responsive device which regulated the cabin pressure from a reasonably low altitude up to a higher altitude, and the reverse, and a differential-pressure responsive device sensitive to the differential of cabin pressure over external pressure, and operable in such a way as always to prevent that differential from exceeding a fixed value.

The present device is in the nature of a refinement of the system disclosed in the Price patent, and more particularly is a division of our application Serial No. 415,602, now patent No. 2,450,881, filed October 18, 1941 for Pressure Cabin Controls. It is intended for use in conjunction with other devices which operate to supply air under pressure within the cabin. These other devices may be so operated as to regulate the amount or vary the pressure of the air which is supplied to the cabin, in accordance with altitude or pressure conditions. The present device may operate (see Figure 3) wholly independently of the pressure-supplying means, or (see Figure 4) it may be connected to the latter to induce compensating adjustment in the latter. The system as a whole, and especially these other devices, are more fully disclosed, and are claimed, in our copending application Serial No. 415,603, filed October 18, 1941.

The present device, in the embodiment illustrated and chosen by way of example, is in the nature of an outflow valve with two regulating or controlling means, one of which is an absolute-pressure sensitive device, and the other of which is a differential-pressure sensitive device, these two devices operating in a manner and to an end similar to the operation of similar devices in the Price patent, but operating now upon a single valve means to control outflow, rather than acting jointly and cooperatively upon an inflow and an outflow valve means, as in the Price patent. When we speak of a single valve means, it is to be understood that normally duplicate valve means would be employed, each of which alone would suffice, and each of which is such a single valve means.

Reference is also made to the copending Price application, Serial No. 216,028, filed June 27, 1938, which discloses how it is possible to regulate and to vary the rate of pressure change in the cabin independently of the rate of ascent or descent, more especially, in accordance with a time factor. By the invention therein disclosed it is possible to effect a given change of cabin pressure in a given period of time, whether or not there is any change of altitude of the airplane, and if there is a change of altitude, regardless of the rate of that change. The same sort of regulation can be effected in the present invention.

If duplicate valve means are employed, one only may be provided with certain adjustments, for instance the adjustments for regulating the rate of pressure change in accordance with a time factor, and the other may not have any similar regulation. Preferably all will have an overriding differential-pressure sensitive device limiting the attainable difference of cabin pressure over external pressure, and, coupled therewith, such other controls or adjustments as are desired, but not necessarily every valve provided with all such other controls or adjustments. In all cases such valves or duplicate valves will control and permit continual outflow, except as one may be a standby valve operative only when another fails. When operative the standby valve will control and permit constant outflow.

The present device operates as an outflow control, and has no essential relation to inflow control. Indeed, given sufficient pressure supply, no regulation of inflow is essential; it is preferred, however, to regulate inflow, and, in some cases, to directly coordinate inflow with outflow.

General purposes

By the arrangement of this invention it is possible to effect unified and sensitive control of the outflow valve means, thereby tending to maintain cabin pressures automatically more nearly at the intended pressures. Thus without manual operation the cabin pressure may be caused to follow a selected line or graph (see Figure 2), and these values, by certain manually or mechanically changeable means, under control, can be varied to suit different conditions, but always for any given setting the values of pressure within the cabin will be maintained automatically closely approximating the intended values—assuming always sufficient capacity in and proper functioning of the pressure supply devices and controls.

Generally speaking, then according to the present invention there is provided a device for controlling or regulating automatically the pressure within a cabin, which pressure is built up by other means, which will permit a certain amount of outflow and therefore provide for proper ventilation of the cabin, which will tend to compensate for, but not to govern, changes in the ventilating rate, independently induced and regulated, and which will operate automatically in accordance with two control devices, one of which may be an absolute-pressure sensitive device and the other of which may be a differential-pressure sensitive device, to the end that the cabin pressure may be maintained automatically at desired values for any given altitude; and which, upwards above the point at which the cabin pressure reaches a selected limiting differential pressure, will not permit the cabin pressure to exceed that differential pressure, whether the tendency to exceed the same arise from an increased rate of supply of air under pressure within the cabin, or from a decrease in the external pressure with increase of altitude.

By way of example, the cabin pressure may be maintained, from sea level up to a selected critical altitude, substantially equal to the external pressure; from that altitude up to a selected higher altitude the cabin pressure may be maintained at a value or values higher than the external pressure, but not exceeding a selected differential, and may indeed follow almost any given curve or graph from almost any point of departure from the atmospheric pressure line to the limiting differential pressure line.

It is also an object to provide a control functioning in accordance with a time factor, as, a rate-of-pressure-change control, or a control operating for a given period of time, which will regulate the cabin pressure conjointly with, as modified by, or independently of, the other controls mentioned above.

With these objects in mind and others, particularly those which pertain to the mechanical construction and arrangement of the device, as will appear from the following specification, our invention comprises the novel parts, and the novel combination and arrangement of the same, both per se and with relation to the pressure cabin and to the air supply means, as is shown in the accompanying drawings, described in this specification, and as will appear more fully from the appended claims.

*The drawings*

The accompanying drawings illustrate the invention in a form which has been found practical, though it will be understood that various changes in the form, character, and arrangement of the parts may be made in accordance with the principles to be made clear hereafter.

*Definitions*

This application deals with pressures and pressure relations that are seldom stable. An absolute pressure that might under given conditions be regarded as positive, or high, will under other conditions be regarded as negative, or low. These terms, or the terms "plus pressure" and "minus pressure," are to be understood always as related to the immediately obtaining conditions, rather than as absolute terms.

The valve will be described as operable by a servomotor, which, as herein shown, takes the form of an air motor, operated by a difference of pressure. The terms "servo means" or "servomotor" are to be understood as including any suitable device, and not necessarily that described if another is suitable.

In the air motor a diaphragm is disclosed, but the term "diaphragm" is to be understood as including a piston, which is a special form of diaphragm, or any suitable pressure-actuated device. Likewise, the term "piston"—particularly as used in describing the differential-pressure sensitive device—is intended to include any form of diaphragm.

*Considerations governing design*

A pressure cabin airplane designed for possible use under a variety of conditions must necessarily operate as a compromise between conditions which might obtain at one time, and conditions that might obtain at a different time, or under different circumstances. Obviously the conditions which obtain upon take-off from or landing upon a landing field which is at an elevation of several thousand feet are different from those which obtain upon take-off from or landing upon a landing field which is close to sea level. The design of the pressure cabin control must take into account the possibility of take-off or landing now at the more elevated field, and again at the lower field, and generally it has been considered that the fundamental considerations which must be brought to a satisfactory compromise in the selection of the pressure altitude relationship to be obtained in such a control are the following:

1. An optimum absolute cabin pressure which is sufficiently high to avoid impairing the safety and comfort of operating personnel and passengers, and sufficiently low to avoid the probability of landing on a landing field at a high elevation with the cabin in an inadvertently "supercharged" condition;

2. A maximum differential between cabin and atmospheric pressures which will not impose prohibitive structural requirements on the cabin; and 3. A maximum ratio of cabin absolute pressure to atmospheric pressure which will not necessitate inordinate weight, size, or power consumption of the compressor.

*Performance characteristics*

Figure 2:
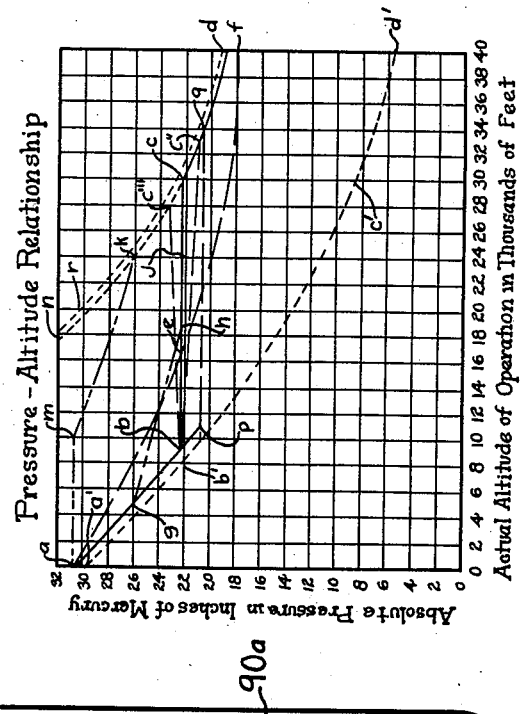
Figure 2 is a graph illustrating the pressure curve which the cabin pressure will follow automatically upon the normal or usually intended operation of the device of our invention.

In view of these considerations it is currently accepted that operations in the range from sea level—$a'$ in Figure 2—up to an appropriately chosen critical altitude, represented at $b$ or $b'$, should be unsupercharged, that is, the cabin pressure should be substantially the same as the external pressure, represented by the line $a'$—$b'$—$c'$—$d'$; that the cabin pressure which obtains at this critical altitude, for instance, 8,000 feet, should be maintained during ascent, as by the line $b$—$c$, until the differential pressure reaches a maximum safe and economical value, equivalent to 14,000 feet, for example, reached at 30,000 feet altitude between $c$ and $c'$ in Figure 2; and that this limiting differential pressure $c'$—$c$ should be, or can well be maintained, along the curve $c$—$d$, so long as the aircraft continues above the altitude at which this differential pressure was reached, and so long as the pressure supply devices can continue to supply adequate air under pressure within the cabin. In the graph, Figure 2, the difference $a'$—$a$ represents the plus pressure due to continuous inflow and restricted outflow.

It must be borne in mind, of course, that the pressures may vary from the accepted graph $a$—$b$—$c$—$d$ thus outlined; for instance, it may be preferred, instead of commencing to supercharge only when the critical low altitude has been reached at $b$, to start supercharging at take-off or at some altitude $g$ lower than that at which normally it would commence automatically, and that it proceed at such a rate as to reach the constant cabin pressure $b$—$c$ at $h$ between the critical low-pressure altitude $b$ and the critical differential-pressure altitude $c$, and then follow the normal graph $h$—$c$—$d$, or that it continue until the limiting differential pressure is reached. Beginning at $b$, or some other such point, the pressure can increase with increased altitude ($b$—$c'$) or can decrease ($b$—$c''$) instead of remaining unchanged ($b$—$c$). Always provision is made that the limiting differential pressure is not exceeded. Within this limiting differential the cabin pressure may be altered at will and at such rate as may be desired, the lower limits of pressure being always the atmospheric curve $a'$—$b'$—$c'$—$d'$, and the upper limits being always the differential pressure curve $n$—$k$—$c$—$d$, or that curve extended to higher altitudes.

It is possible, too, to anticipate a pressure change, and without actual change of altitude to accomplish a change of cabin pressure, as from $j$ to $k$, and then to $m$. Always, and regardless of the part of the field of action chosen, the differential-pressure sensitive device is a sentinel to prevent that differential being exceeded, to the possible detriment of the cabin structure.

Reference is made to the patent of James B. Cooper, one of the co-inventors herein, No. 2,307,199, issued January 5, 1943, to illustrate the possibilities of controlling the rate of pressure change, and of operating other than along an unvarying graph.

Figure 3:
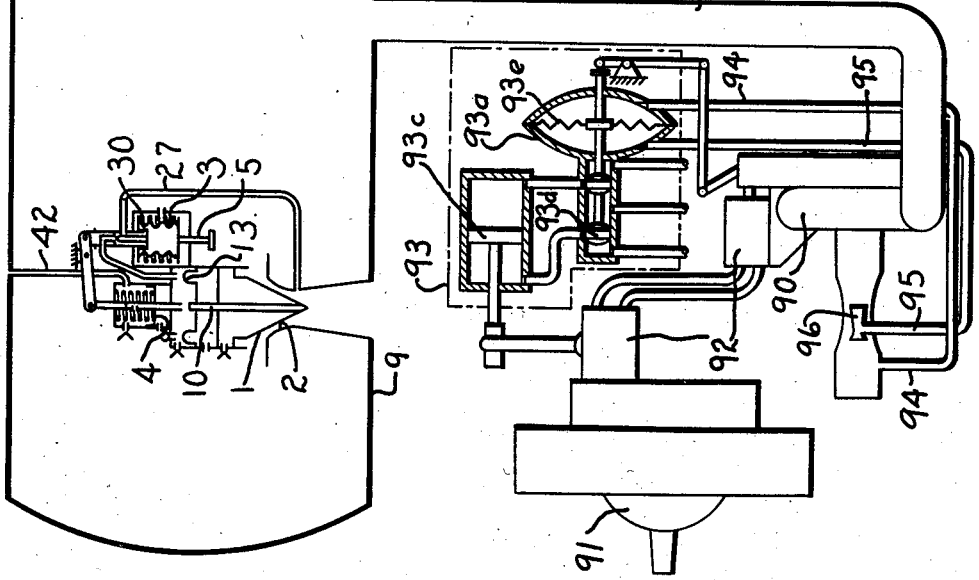
Figure 3 is a diagrammatic showing of a pressure cabin, showing the device of the present invention incorporated therein as a pressure control device entirely independent of the pressure supply source, likewise associated with the pressure cabin.

For a further understanding of the manner of operation of the device and the principles governing the same, reference is made to the co-pending Price application, Serial No. 216,028, referred to above, and particularly to Figure 3 therein.

Figure 2, representing at $a$—$b$—$c$—$d$ an example of the normal manner of operation of the present device in an actual airplane, shows that there will be no essential supercharging effect so long as the cabin absolute pressure exceeds 22.22 inches of mercury, which is equivalent to a pressure altitude of 8,000 feet. This is below the altitude where human distress is noticeable, yet is higher than most landing fields. The 8,000 foot pressure altitude will then be maintained within the cabin until the limiting differential pressure of 13.34 inches of mercury is reached, which will normally occur at an altitude of 30,000 feet. At altitudes above 30,000 feet the limiting differential pressure of 13.34 inches of mercury will be maintained until the compressor or equivalent means to supply air under pressure within the cabin becomes incapable of producing the required pressure rise.

The cabin and air supply devices

In the drawings the skin of the airplane is represented at 9, and this skin is so constructed as to be reasonably air-tight for all internal pressures which do not exceed the external pressure by more than the selected differential. This is purely a design matter, and the skin can be made sufficiently tight to hold any desired differential, but it is scarely economical and practical to attempt to hold sea level pressure up to the ceiling of the aircraft since this would require such structural complications and added weight as to make the airplane economically impractical. The skin 9 is tight against reasonable leakage, although some leakage is bound to occur, particularly as the differential limit is aproached or reached.

Figure 4:
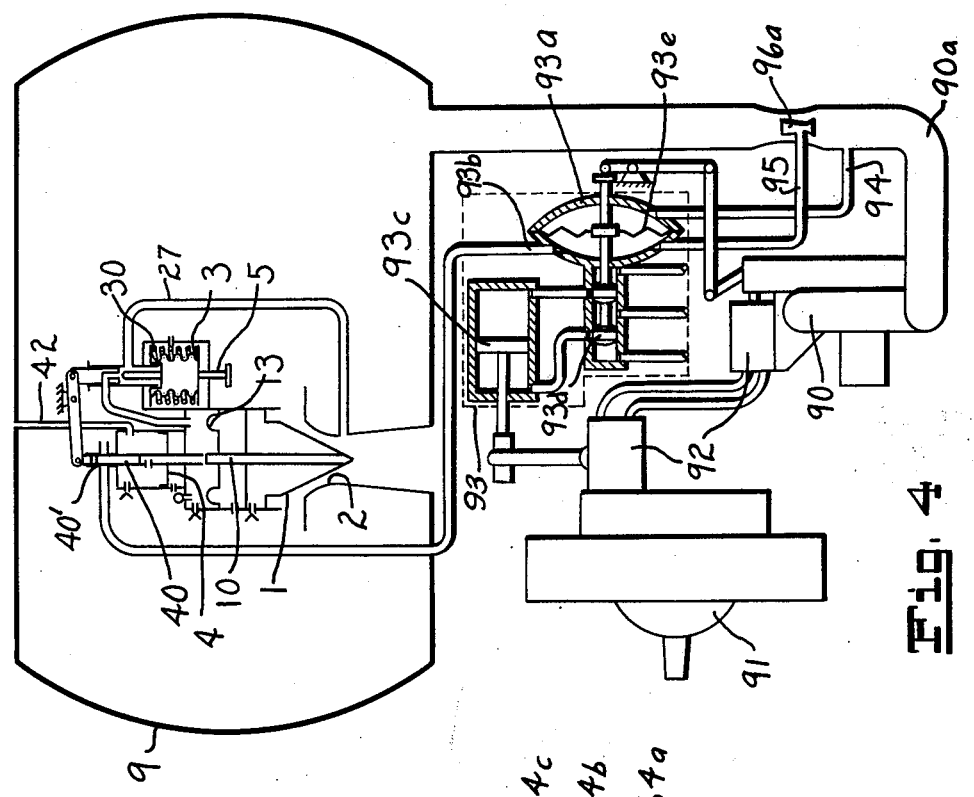
Figure 4 is a similar view showing the device of the present invention arranged to produce compensating action in the pressure supplying means.

As is seen in Figures 3 and 4, air is supplied under pressure within the skin 9 by means which are represented as the blower 90 driven from a suitable source of power, such as a propelling engine 91, through a speed varying device indicated at 92 and controllable by the device indicated collectively by the numeral 93. Control is effected in accordance with pressure conditions and flow conditions, or is controlled in any suitable manner, the control being represented as the pressure sensitive device 93$a$ connected at 94 and 95 respectively to a duct leading to or from the blower and to a Venturi diffuser 96 or 96$a$ within that duct. The pressure-sensitive device 93 may also be sensitive through a duct 93$b$ (see Figure 4) to the cabin pressure. Without describing the arrangement in further detail, it may be said that the blower 90 will supply air under pressure within the cabin 9 through the duct 90$a$ at a rate which is sufficient, within the capacity of the blower, to maintain a cabin pressure in excess of that which it is desired to maintain for the actual altitude of the aircraft. In other words, there is supplied an excess of pressure, which excess is relieved, controlled, and regulated by the device shown in Figure 1. Since the particular form and arrangement of the air supply means is not material to the present invention, and may take various forms, as is disclosed more fully in our copending application Serial No. 415,603, referred to above, no more need be said at this point concerning the same. Reference is made to that copending application for a fuller understanding of the air supplying means, and to a later point in this specification for an explanation of its operative relationship to the present control device.

The pressure control device

Figure 1:
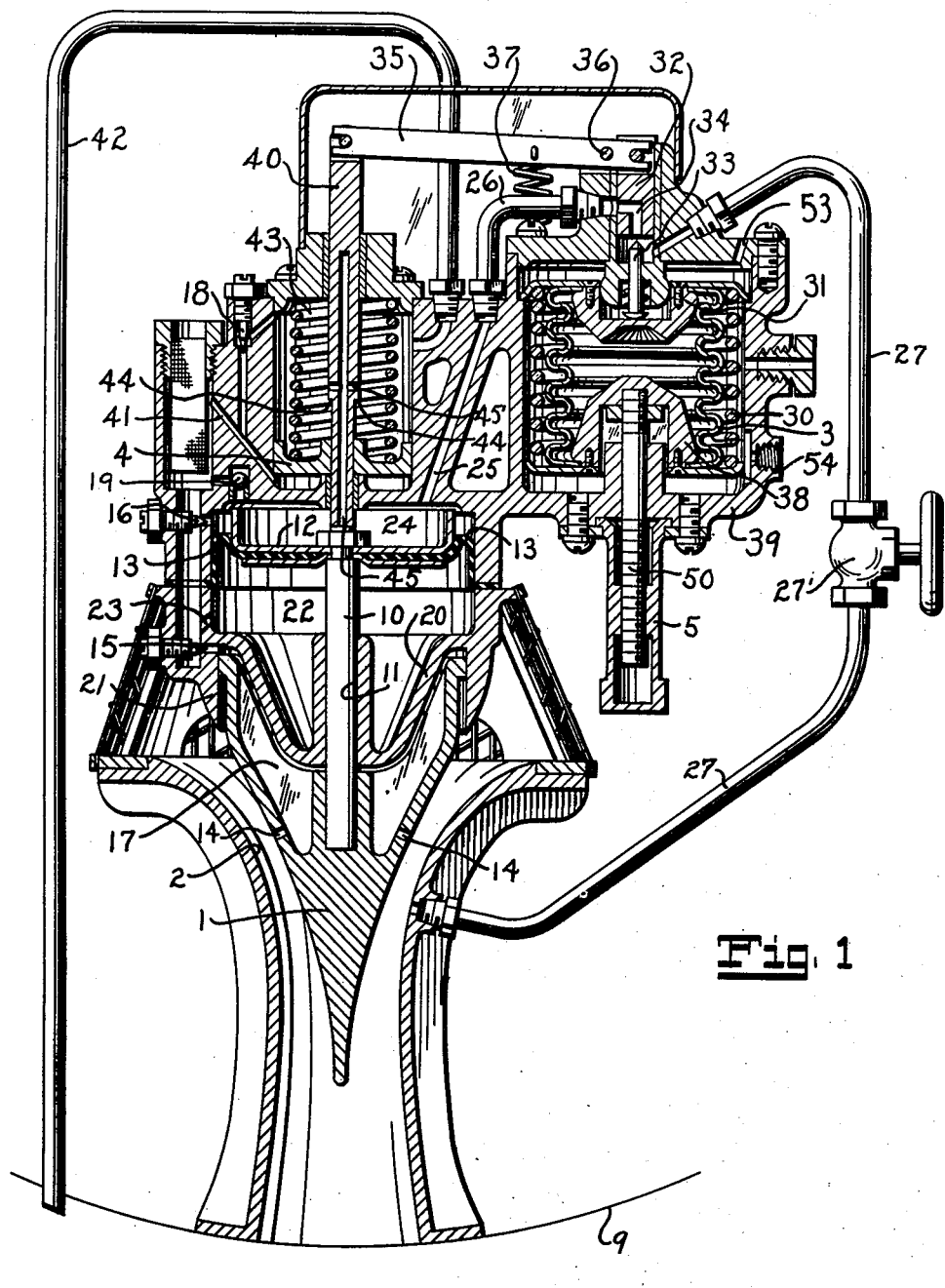
Figure 1 is in general an axial section through the outflow valve and the control mechanism, illustrating the parts in the low altitude position, that is, the position wherein the cabin pressure is substantially the same at all altitudes as the external pressure.

The construction and operation of the pressure control may be best understood by following through a cycle of operation. Figure 1 shows the position of parts at low altitudes, where the cabin is substantially unsupercharged, but where the air is being supplied by the air supply means in a manner and at a rate which, without proper operation of the pressure control device, would effect supercharged operation.

Condition A

In this range of altitude cabin pressure in excess of atmospheric pressure is not required, although a small pressure differential will usually exist because of the restricted escape of the normal quantity of ventilating air which enters the sealed cabin 9 through the compressor or through independent fresh air scoops.

The valve 1 controlling outflow from the cabin 9 tends to seat upon a diffuser seat 2 by virtue of the low pressures which are existent on the lower surface of the valve as shown and which are partially due to the Venturi action of the air passage, and partially due to any differential pressure existing between the cabin and the atmosphere. This action is independent of the attitude or positioning of the valve. If the valve is mounted in the vertical position, as shown in the preferred arrangement of the drawings, gravity forces will tend to seat it, in addition to the fluid pressure-created forces. The valve 1 is carried upon a spindle 10, guided for axial movement at 11, and upon the upper end of this spindle, above the partition 20, is secured a sealing diaphragm 13 backed by the piston 12. The pressures due to the outflow of air, and for some positions of installation, the weight of the diaphragm and valve assembly, would normally seat the valve at 2 to close off outflow from the cabin.

It is evident that a suitable differential pressure acting upward across the diaphragm 13 will overcome the gravitational force and any other forces which act downward upon valve 1, and will thereby cause the diaphragm and valve assembly to rise, particularly since the effective area of the diaphragm 13 is somewhat greater than that of valve 1.

To assist in holding the assembly raised, once the valve is open, the space 17 above the hollow valve body 1 is in communication with a low pressure source. As shown, it is provided with vent holes 14, located somewhat below the portion of the valve which seats upon the diffuser, but being approximately in the throat of an annular venturi formed between the open valve and the diffuser seat, and the interior of the space 17 thus formed between the hollow valve 1 and the partition 20 is open to cabin pressure past a needle valve 15, which restricts access of cabin pressure to the chamber 17. The pressure within the chamber 17 is reduced by suction through the vent holes 14, tending to resist closure of the valve 1. Leakage past the lip of the valve 1 where it slides within the cylinder 21 may somewhat alter these conditions, but is small, and can be compensated for by adjustment of the needle valve 15, or if preferred, leakage at this clearance can be eliminated by the employment of a sealing diaphragm between the casing part 21 and the lip of the valve, similar to the diaphragm 13.

In lieu of the holes 14 in the valve 1 an alternate arrangment is to connect chamber 17 to the passage between valve 1 and diffuser seat 2 or any source of lower pressure by means of an exterior tube. If the effective area of the diaphragm 13 is sufficiently large, the provisions described above will be unnecessary for the operation of the control.

The chamber 22 beneath the diaphragm 13 is in free and open communication with the interior of the cabin, and of course to the cabin pressure, through a vent 23. Cabin pressure therefore acts upwardly upon the diaphragm 13 and the diaphragm and valve assembly, tending to hold the valve upraised in opposition to gravity and other forces, and the final control for the diaphragm and valve assembly therefore depends upon the negative pressure within the chamber 24 above the diaphragm. Air from the cabin, under pressure, enters the chamber above the diaphragm 13, past the needle valve 16, and escapes through the port 25 and extension tube 26 under certain conditions—these conditions including an effective connection from the tube 26, as by way of the tube 27, to a source of minus or low pressure. A convenient low pressure source is the throat of the annular venturi adjacent the diffuser seat 2. Another source might be external atmosphere, particularly at appreciable altitudes, or the vacuum system of the airplane.

For the condition of operation now under consideration air flows away from the chamber 24 without appreciable restriction, and if the needle valve 16 is properly adjusted it will restrict the flow of air from the cabin sufficiently to cause a reduction in pressure relative to the cabin pressure above the diaphragm 13. This is additive to any reduction of pressure within the chamber 17. Under such circumstances even a slightly lower external pressure communicated through the tube 27 to the chamber 24, or even a slightly higher cabin pressure acting through the port 23, will cause the valve 1 to open, and thereby prevent any increase in cabin pressure relative to external pressure.

It is desirable, but not entirely practical, that this condition of operation should persist throughout the range of altitudes at which the aircraft will normally be operated. It is not entirely practicable for the reason that it will occasionally be necessary for the airplane to climb to such altitude that altitude effects may be felt by the crew or the passengers, and before this can occur supercharging should be commenced. At a suitable cabin pressure altitude this form of operation terminates, and supercharging begins.

Upon the attainment of a selected critical low altitude, yet where the atmospheric pressure is sufficiently low that it is desirable for supercharging to commence, the cabin pressure, acting upon the evacuated Sylphon bellows 3, which may be considered an absolute-pressure sensitive device, becomes inadequate to equilibrate the combined expansive forces exerted by the spring 30 and by the resiliency of the bellows itself. Consequently the bellows begins to expand. Upon its expansion, assisted by the spring 30, in an upward direction in the drawings, its head 31 acts upon the metering pin 33 to restrict the flow of air through the orifice 34 in the slidable plug 32, which is interposed between the tube 26 and the outlet tube 27. This restricts the flow of air from the upper side of the diaphragm 13 through the orifice 34, and thus tends to equalize the pressure across the diaphragm 13, causing the valve 1 to move towards its seat, as previously explained. Closing movement of the valve, unless accompanied by precisely corresponding reduction of pressure of the inflowing air to the cabin, which does not ordinarily occur, increases the cabin pressure. This in turn causes recompression of the bellows 3 and reopening of the orifice 34 to the passage of air from the upper side of the diaphragm 13, which results in the reopening of the valve 1 and a consequent reduction of cabin pressure.

It is clear that the foregoing action would result in a repetitious cycle of instability wherein the valve would hunt and the cabin absolute pressure would oscillate between values slightly above and slightly below the preselected critical value at which the bellows 3 begins to expand. This undesirable effect is overcome by the linkage of the valve 1 to the orifice 34 through the plunger 40 and rocker arm 35, the fulcrum of which is at 36, and which may have its longer arm pulled downwardly by the spring 37. As the valve 1 closes in response to expansion of the bellows 3 the orifice 34 is withdrawn slightly from the metering pin 33, thus tending to reopen the passage through the orifice 34 and to check the downward travel of the valve 1. Conversely, as the valve opens to relieve superfluous air from the cabin the orifice 34 descends upon the metering pin 33, and thereby restricts the flow of air from the upper side of the diaphragm 13, and checks the upward travel of the valve 1. It can thus be seen that as the valve begins to move in either direction in response to change in cabin absolute pressure there is an immediate counter effect which opposes such motion and prevents overtravel of the valve. The result is that the position of orifice 34 and metering pin 33 relative to each other is so maintained as to meter the flow of air from the upper side of diaphragm 13, and thereby cause valve 1 to seek a stable position.

Since this stable position of the valve may vary considerably with changes in the ventilating rate, differential pressure, or in cabin leakage conditions, the linkage between valve 1 and orifice plunger 32 is so arranged that the travel of the valve is considerably greater than that of the orifice, the ratio of such movements in the particular installation pictured being approximately eight to one. In this way neither the position of the orifice 34 nor the critical cabin absolute pressure which the unit tends to maintain is appreciably altered by any responsive movement of the valve.

It is evident that the orifice 34 might move relative to the metering pin 33 under the influence of the bellows 3, with like results. In other words, the arrangement of 33 and 34 might be reversed, and a description of the one is intended to include the reverse.

The regulating effect described occurs because the action of the spring (the actual spring 30 or the bellows 3 considered as a spring) occurs within a very narrow range, and hence there is substantially no change, during operation, in its effective spring force. By change in the spring rate of the bellows unit or its spring, the limits of cabin pressure between the illustrative altitudes of 8,000 feet and 30,000 feet may be made to follow curve $b-c'''$, or $b-c''$, as shown in Figure 2. Similar results can be obtained otherwise—for instance, by changing the leverage ratio of the follow-up rocker arm 35, or by changing the relative size of the metering pin 33 and its orifice 34, or by two or more such changes combined.

It may be pointed out here that the value of the critical limit can be altered, to start supercharging either before or after reaching the 8,000 feet specified critical limit of low altitude operation. The critical limit can be lowered by moving upwardly the base 38 of the bellows 3. Thereby in effect the spring force resisting collapse of the bellows 3 by the pressure on it of the air in casing 39 is increased. Also, by control of the rate of upward movement of the base 38 the rate of supercharging can be controlled. These facts are merely mentioned at this point, and their significance and application will be explained in greater detail hereafter.

When the cabin differential pressure attains the chosen limiting value during ascent, under conditions of isobaric regulation, a differential-pressure sensitive device automatically overrides the absolute-pressure sensitive device 3 under all conditions, and assumes command of the pressure regulation within the cabin, to the end that the selected differential may never be exceeded.

A piston 4 is exposed to cabin pressure on its lower side through a vent 41, and to atmospheric pressure on its upper side through the tube 42. Cabin pressure, throughout isobaric operation, is elevated above atmospheric pressure. At the critical differential of cabin pressure over external pressure spring 43 is sufficiently compressed by the upwardly moving piston 4 that the piston engages a shoulder 44 on the plunger 40. If, by reason of continued ascent and lowered external pressure, or by reason of increased cabin pressure, there is a tendency to exceed this differential, the plunger 40 is raised upwardly and separated from the stem 10, to which it has heretofore been held by spring 37 acting through lever 35. In practice the separation is minute, only a few thousandths of an inch, but it must be exaggerated in the drawings for purposes of clearer illustration. With the downward force of spring 37 on the valve 1 through lever 35 and plunger 40 removed, the flow of air from the upper side of the diaphragm 13 through the aperture 45 in the plunger 40, by way of its ports 45' and the tube 42, reduces pressure above the diaphragm 13 and causes the valve to open and relieve cabin pressure, as explained previously. Overtravel of the valve is prevented by the fact that, as contact between the plunger 40 and the stem 10 is broken by the action of the differential pressure control, the valve assembly follows the plunger 40 upwardly by reason of the increased fluid pressure differential acting on it, and tends to restrict the entry of air into the bore 45 of the plunger. It is thus evident that an immediate resistance to further motion accompanies any increase in the lift of the valve in response to action of the differential pressure control, and that there will be no tendency for the valve to hunt, or for cabin pressure to fluctuate. The absolute-pressure sensitive device 3 will extend toward its full upward travel as altitude is increased and external pressure is lowered, so that the passage of air through the orifice 34 is eliminated by closure of the metering pin 33, except for negligible leakage.

The stem 10 has been shown integral with the valve 1, and with the piston 12 fixed directly thereupon. These elements may be altered in their relationship, without change in the essential nature of the invention. The stem 10 has been shown solid, and the plunger 40 hollow, and this relationship might be reversed, so that the chamber 24 is vented to a low pressure source through a hollow valve stem, and the cooperating plunger 40 would then be solid. Such reversal is within the spirit of our invention.

For brevity the piston 4 may be spoken of as the differential-pressure sensitive device, as the bellows 3 has been referred to as the absolute-pressure sensitive device. While each of these is the element most immediately affected by such pressure conditions, it will be realized that the associated elements, together with and in their relationship to the elements 4 or 3, as a whole make up, respectively, the differential-pressure sensitive means and the absolute-pressure sensitive means.

Safety devices

It is conceivable that negative pressure might fail, by reason of a sufficiently rapid descent, or, if the source of low pressure for operation of the diaphragm 13 or the piston 4 is the vacuum system of the airplane, it is conceivable that this might fail to function. In either case there would be a failure of negative pressure in such a way that there would be a tendency for the valve 1 to close and remain closed, to an extent that atmospheric pressure might exceed cabin pressure. It is desirable to prevent the possibility of reverse stresses, thus arising. A check valve 19 is normally seated to close off an orifice that otherwise would afford communication between the cabin pressure and the space 24 above the diaphragm 13.

Valve 19 is normally held seated by the differential pressure existing between the cabin and the chamber 24, which is normally at some pressure below cabin pressure. If the external pressure should exceed the cabin pressure this external pressure would communicate with the chamber 24, for instance through the tube 27, past metering pin 33, and through tube 26, and the valve 19 would then unseat and permit equalization of cabin pressure with the external pressure, and would thereby assist in opening the valve 1 by removing obstacles to its opening under the higher external pressure acting upwardly upon it.

A normally open valve 27' may be included in the tube 27. If the absolute-pressure sensitive device 3 should fail to function properly, it can be cut out by closing the valve 27'. This leaves the limiting differential-pressure sensitive device 4 still fully operable, to prevent the cabin pressure exceeding the predetermined difference over external pressure, and by suitable means the pressure supply can be augmented or manually controlled, if necessary, to supply adequate pressure within the cabin.

Selective isobaric and differential pressure regulation

The cabin pressure which will be maintained during operation under isobaric conditions may be altered, within practical limits, by altering the adjustment of the absolute-pressure sensitive device 3. This adjustment may be accomplished in various ways, for instance by altering the compression of the spring 30, the compression in the bellows 3 itself, or the starting point or position of the base 38 and needle valve 33 with relation to the orifice 34.

Practically speaking, such adjustment is readily accomplished by rotating the swiveled and internally threaded adjusting cap 5 (or a cable drum mounted thereupon) relative to the screw 50 which supports the base 38. If the cap 5 is rotated in a direction to raise the base 38, the elongation of the bellows which is required to produce the necessary metering effect through the orifice 34 is decreased, and the critical low pressure altitude at which isobaric control commences (b in Figure 2) will be lowered. Contrariwise, if the cap 5 is rotated in a direction to lower the base 38, the elongation of the bellows 3 which is required to produce the necessary metering effect through the orifice 34 is increased, and isobaric regulation does not commence until a higher altitude is reached; see, for example, line $p$—$q$ in Figure 2.

In this way, and without more, the point at which isobaric regulation commences may be adjusted at will and during flight. Adjustment of the starting point, however, will not affect the nature of the graph, Figure 2, nor affect the essential nature of operation of the absolute-pressure sensitive device 3 nor of the differential-pressure sensitive device 4. No such adjustment of the starting point of isobaric regulation, as from $b$ to $p$, can affect the initiation of differential pressure operation when the limiting differential is reached. In other words, no adjustment of the pressure which is maintained during isobaric regulation can cause the differential-pressure sensitive device to fail to operate when the selected differential of pressure is attained, along the line $n$—$c$—$d$.

The cabin differential pressure which will be maintained during operation under maximum limit is to a small extent adjustable (see line 4, Figure 2) by means of a needle valve 18, which controls communication between the upper and lower sides of the piston 4. In the drawing such piston has been shown as the preferred arrangement, but the differential pressure controlability of the unit will function equally well if a diaphragm similar to 13 be used. It is clear that if the air leakage around piston 4 is negligible, the differential pressure across the piston 12 will be substantially equal to the difference between cabin pressure and atmospheric pressure. Then if a leakage be induced either by increasing the clearance between the piston and the cylinder, or by opening needle valve 18, there will be a small pressure loss from the chamber below the piston to the tubing 42, or a small increase in pressure above the piston, or both, either or both of which changes will in turn reduce the differential pressure acting upon the piston. Likewise it is evident that a small increase in leakage through the valve 18 is equivalent to an increase in the elastic properties of the spring 43. By adjustment of the valve 18 the value of the differential pressure may be altered to increase or to decrease it.

It is possible to obtain any desirable range of adjustment of both the absolute and differential-pressure control elements by the proper variation of the effective elastic properties of the springs 30 and 43, according to expedients which are universally employed for spring adjustments.

Compensating needle valves

Adjustment of needle valve 16 permits the proper coordination of the passage of air from the cabin to the upper side of the diaphragm 13 with the restrictions arising from each individual installation of tubes 27 and 42. Also it serves as convenient adjustment of the leakage to chamber 24 and thence out through the absolute pressure sensitive control, which leakage effectively controls the stability of operation of the control valve 1 when under isobaric regulation.

Needle valve 15 has been provided for the purpose of compensating for varying clearances around the lip of valve 1 and permits the proper coordination of the leakage into chamber 17 with the leakage out through holes 14. In other forms of the device it might serve the purpose of varying the damping effect of the air entrapped above valve 1 in chamber 17.

Rate of pressure change control

As has already been pointed out, the cabin pressure, between the lower limit fixed by the atmospheric pressure curve $a'$—$b'$—$c'$—$d'$ and the upper limit fixed by the differential pressure curve $n$—$c$—$d$, may be varied by adjustment of the metering valve 33 with respect to its orifice 34, or vice versa. It has already been pointed out that such an adjustment may be accomplished by adjustment of the position, up or down, of the base 38. Such adjustment as heretofore explained was for the purpose of determining and adjusting the initial point ($b$ to $p$) and absolute value of isobaric regulations. However, such adjustment can also be used for the further or somewhat different purpose of imparting a time element and of accomplishing increase or decrease of pressure at any point, from sea level to the ceiling of the pressure supply system, within the limit fixed by the differential pressure control device, independently of or at a rate different from that normally required by ascent or descent.

To illustrate by reference to Figure 2, a pilot taking off from sea level at pressure $a$ may intend to ascend as rapidly as possible to an altitude which is above that represented at $c$. Instead of attempting to follow the substantially unsupercharged curve $a$—$b$ and thence by way of $b$ to $c$, the pilot may prefer to decrease his cabin pressure at a rate which will bring him to the value $c$ at the time, having in mind his rate of climb, that he will reach the altitude represented at $c$. Or, he may wish to lower his cabin pressure at a rate which will bring him back to the line $b$—$c$ at the point $e$, and thence forward he may follow the line $e$—$c$—$d$, or he may wish to continue at a substantially constant rate of decrease of cabin pressure from $e$ to $f$, and so on until he reaches the differential pressure limit $c$—$d$. Again, after he has climbed for some distance, he may, at an altitude corresponding to $g$, wish to decrease his cabin pressure at a rate which will bring him on the curve $b$—$c$ at the point $h$, and thereafter he may follow the curve $h$—$c$—$d$. In descending he may be at an altitude corresponding to the point $j$, and in anticipation of a later descent, but without actually descending, he may increase his cabin pressure, as indicated from $j$ to $k$, and then further decrease it from $k$ to $m$, representing the pressure at his landing field, and thus, while several thousand feet above his landing field, but still well within the permissible differential, he may attain within the cabin a pressure corresponding to the pressure at the landing field. By such means he may lessen the rate of cabin pressure rise or fall, so that passengers and crew may become more gradually accustomed to the altered pressure.

Figure 5:
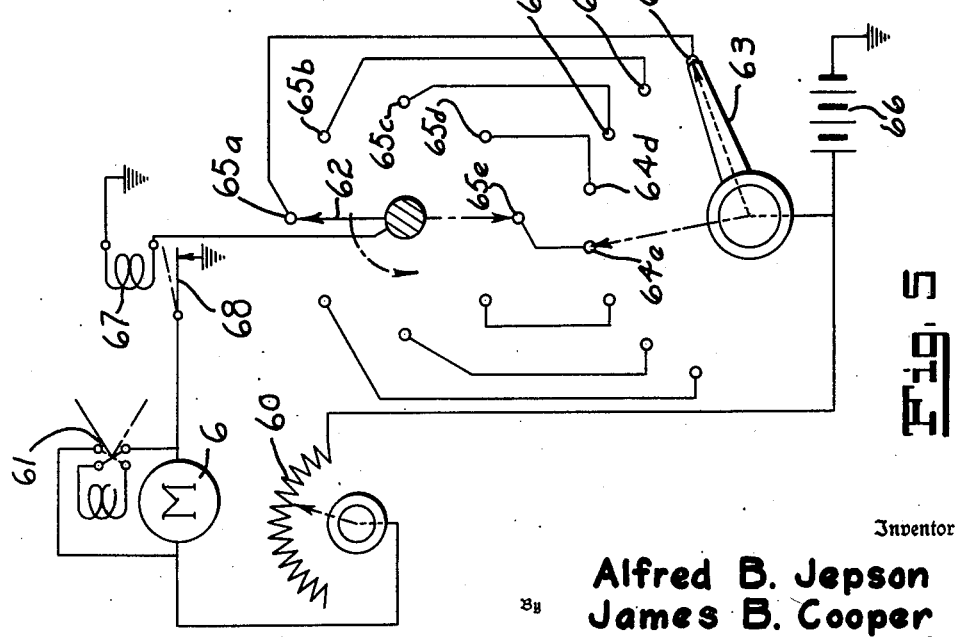
Figure 5 is a wiring diagram, illustrating how the normal operation of the device of this invention may be altered to produce different effects, and in particular to produce a change of pressure in the cabin at a rate which is different from the rate which would be imposed by the actual rate of ascent or descent of the airplane.

By the use of the basic cabin pressure control already described, these ends can be attained simply by governing the rate of rotation of the screw cap 5 or equivalent means, and by governing thereby the rate of rising or lowering of the base 38. A suitable means for accomplishing this operation is illustrated diagrammatically in Figure 5, wherein 6 represents a reversible variable-speed motor operatively connected by any suitable drive means to the cap 5 for moving the base 38 at a controlled rate and in either sense.

The means for rotating the motor and for controlling its speed may be any that are desired, and that shown herein is to be understood as merely representative of any one of several means that could be employed. For instance, 60 represents a rheostat to control the speed of the motor, and 61 a reversing switch to control its sense of rotation. In addition it may be provided with a means which is automatically capable of stopping the motor after a given time interval or after a given number of rotations.

Thus, for example, 63 represents a settable contact arm engageable with any one of a number of contacts 64a, 64b, 64c, etc. We may assume that it is set in contact with the point 64e. The contact arm 62, driven by or synchronized with the motor 6, rotates past a series of contacts 65a, 65b, 65c, etc., corresponding to and connected each with its respective contact 64a, 64b, etc. Current from a source represented at 66 may pass, when the rotating contact arm 62 engages the contact point 65e, by way of the settable arm 63 and the rotatable arm 62 to an electromagnet 67, which upon being energized opens a switch 68 in the circuit of the motor 6, and stops the operation of the motor. Alternatively the arm 63 may be motor-driven, in which case the other arm 62 will be the settable arm.

By such an arrangement it is possible to regulate the speed of the motor, its sense of rotation, and the time period during which it is to operate. By control of these factors, acting to rotate the screw cap 5 in one or the other sense for a selected period of time and at a selected rate of rotation, it is possible to achieve change of pressure within the cabin at any rate desired, whether for increase or decrease as desired, and throughout any time period desired.

Nevertheless, with any possible adjustment of the screw cap 5 and of the absolute-pressure sensitive device 3 which is thereby entailed, the differential-pressure sensitive device 4 is always capable of functioning and does function to prevent, under any conditions, the exceeding of the selected differential of pressure represented at $c'$—$c$ in Figure 2.

*Balancing of pressure supply means with the pressure control device*

The arrangement of Figure 3 shows the pressure control device as completely independent of the pressure supply device, although the two will be balanced in their design, so that such necessary pressure will be supplied at all altitudes as can be properly controlled by the pressure control device. This particular arrangement contemplates a constant rate of flow, but a variation in the speed of the blower to maintain the flow constant under different pressure conditions. Briefly the arrangement illustrated in Figure 3 includes a servo piston 93c controlled by a pilot valve 93d and controlling the hydraulic change speed gearing 92. The pilot valve 93d is under the control of a pressure-sensitive device represented as the diaphragm 93e within the casing 93a, subjected on the one side to minus pressure through the tube 95 and on the other side to plus pressure through the tube 94, which pressure difference is a function of flow into or through the cabin. The arrangement is such that, regardless of the absolute pressure being maintained in the cabin by its automatic pressure control, and regardless of the pressure rise that the blower must maintain to produce that pressure, the blower will be speeded up, as required, to maintain a substantially constant flow of air into the cabin.

In Figure 4 the arrangement is the same as that in Figure 6 except that the lower pressure side of the pressure regulator 93a has connected to it a tube 93b leading from within the cabin. However, this tube 93b is not normally in communication with the plus pressure in the cabin. The plunger 40 is normally interposed as a valve between the cabin pressure and the interior of the tube 93b. The plunger 40, however, has an aperture 40' which may afford communication between the interior of the tube 93b and the cabin. Such communication occurs when the valve 1, by reason of dropping cabin pressure, approaches closed position, thereby applying the cabin pressure as a plus pressure to the low pressure side of the diaphragm 93e, tending to equalize the pressures on the two sides of this diaphragm, and destroying the low pressure effect on the normally low pressure side, and thereby reacting to adjust the blower control to speed up the blower. Thus cabin pressure is prevented from dropping and is maintained substantially constant by the speed-up of the blower, and the air supply is balanced against the outflow from the cabin. Any undue increase of cabin pressure can be avoided by normal operation of the pressure control devices, or the interconnection can be so arranged as to decrease the blower's speed correspondingly.

We claim as our invention:

1. Mechanism for controlling the pressure of air within an aircraft cabin to which air under pressure is supplied, comprising pressure controlling means responsive to cabin pressure and operable automatically to regulate the cabin pressure, and motor drive means operatively connected to said pressure controlling means and operable to adjust the same at a predetermined rate, to alter the cabin pressure from that normally effected by said automatic regulating means and at a rate corresponding to the rate of adjustment of said pressure controlling means effected by said motor drive means.

2. Mechanism for regulating aircraft cabin pressure, comprising a valve movable to control flow of air through the cabin, valve actuating means normally operable to regulate said valve for maintaining the aircraft cabin pressure at a substantially constant value, motor drive means, and mechanical thrust-producing means interconnecting said motor drive means and said valve actuating means and operable to drive the same at a predetermined rate by operation of said motor drive means to alter the position of said valve, and consequently the cabin pressure, at a corresponding rate.

3. Mechanism for regulating aircraft cabin pressure comprising regulating means movable to control flow of air through the cabin, actuating means normally operable to control said regulating means for maintaining the aircraft pressure at a substantially constant value, drive means operatively connected to said actuating means and operable to adjust the same for effecting operation of said regulating means to alter the cabin pressure at a rate corresponding to the rate of adjustment of said regulating means, and means driven by said drive means and operatively connected to said drive means, and operable to terminate operation of said drive means upon completion of a predetermined movement thereof corresponding to the total alteration in cabin pressure desired.

4. Mechanism for regulating aircraft cabin pressure, comprising a valve movable to control flow of air through the cabin, valve actuating means normally operable to regulate said valve for maintaining the aircraft cabin pressure at a substantially constant value, motor drive means operatively connected to said valve actuating means and operable to drive the same at a predetermined rate to alter the position of said valve, and consequently the cabin pressure, at a corresponding rate, and control means driven by and operatively connected to said motor drive means, and operable to terminate operation of said motor drive means upon completion of a predetermined movement thereof corresponding to the total alteration in cabin pressure desired.

5. Mechanism for regulating aircraft cabin pressure, comprising a valve movable to control outflow from the cabin, a pressure responsive means subject to cabin pressure and including an evacuated bellows having a support at one end, means connected to the movable end of said bellows and operatively connected to control said valve in accordance with axial expansion or contraction of the bellows to effect movement of said valve for maintaining cabin pressure at one predetermined, substantially constant value, and adjusting means operable to set said pressure responsive means for maintaining cabin pressure at different substantially constant values, and motor drive means operatively connected to said adjusting means and operable to shift the same at a predetermined rate to adjust said pressure responsive means, and consequently said cabin pressure value, to change at a corresponding rate the constant cabin pressure setting of said pressure responsive means, and in turn to alter the cabin pressure.

6. Mechanism for regulating aircraft cabin pressure defined in claim 5, and spring means tending to expand said bellows, the adjusting means being operable to adjust said spring means for altering the degree of bellows-expanding force exerted thereby on said bellows, to set the pressure responsive means.

7. Mechanism for regulating aircraft cabin pressure, comprising a valve movable to control outflow from the cabin, a pressure responsive means subject to cabin pressure and including an evacuated bellows having a support at one end, and means connected to the movable end of said bellows and operatively conected to control said valve in accordance with axial expansion or contraction of the bellows to effect movement of said valve for maintaining cabin pressure at one predetermined, substantially constant value, said bellows support being movable to set said pressure responsive means for maintaining cabin pressure at different substantially constant values, and motor drive means operatively connected to said bellows support and operable to shift the same axially at a predetermined rate to adjust said pressure responsive means, and consequently said cabin pressure value, to change at a corresponding rate the constant cabin pressure setting of said pressure responsive means, and in turn to alter the cabin pressure.

8. Mechanism for controlling the pressure of air within an aircraft cabin to which air under pressure is supplied to supercharge it, comprising control means responsive to cabin pressure including an adjustable member for regulating the air pressure in the cabin, an electric motor for moving said adjustable member, and means for regulating the speed of said motor for controlling the rate at which a change in setting takes place.

9. Mechanism for regulating aircraft cabin pressure, comprising an outflow valve, fluid-operated servo means operatively connected to move the valve, means movable to govern flow of fluid through said servo means, motor means operable to move said fluid flow governing means, and selective deenergizing means settable to effect deenergization of said motor means after completion of predetermined movement thereof selected by setting of said deenergizing means, thereby to establish the desired displacement of said moving means operative to alter the position of said valve, and consequently the cabin pressure.

10. Mechanism for regulating aircraft cabin pressure, comprising an outflow valve, fluid-operated servo means operatively connected to move the valve, means movable to govern flow of fluid through said servo means, moving means operable to move said fluid flow governing means, means settable to establish the extent of movement of said moving means, and means operable to select the rate of movement of said moving means, thereby to establish the time period during which said moving means is operative to alter the position of said valve, and consequently the cabin pressure.

11. Mechanism for regulating aircraft cabin pressure, comprising an outflow valve, servo means operatively connected to the valve, control means operable to control said servo means by effecting thereon a valve-opening force which varies in accordance with the difference of cabin pressure over external pressure, whereby to prevent the cabin pressure from exceeding a selected differential over external pressure, and pressure changing control means also operable to control said servo means, including operating means operable at will to effect movement of said valve by the servo means and thereby to effect change of cabin pressure regardless of change of altitude or rate of change of altitude of the aircraft, means settable to preselect the extent of operation of said operating means within the limiting differential of cabin pressure over atmospheric pressure established by said control means, and deenergizing means controlled by said settable means and operatively connected to said operating means to deenergize the same at completion of the extent of operation for which said settable means are set and attainment of the corresponding degree of change in cabin pressure.

12. Mechanism for regulating aircraft cabin pressure, comprising an outflow valve, servo means operatively connected to the valve, control means operable to control said servo means by effecting thereon a valve-opening force which varies in accordance with the difference of cabin pressure over external pressure, whereby to prevent the cabin pressure from exceeding a selected differential over external pressure, and pressure changing control means also operable to control said servo means, including variable speed electric motor means operable at will to drive said valve at a substantially constant speed by the servo means and thereby to effect change of cabin pressure at a substantially constant rate regardless of change of altitude or rate of change of altitude of the aircraft, and means settable to preselect the rate of operation of said electric motor means to establish the desired constant rate of change in cabin pressure.

13. Mechanism for regulating aircraft cabin pressure defined in claim 12, and means settable to preselect the extent of operation of the electric motor means to establish the degree of change in cabin pressure produced, and hence the time period within which such change in cabin pressure occurs.

14. Mechanism for regulating the pressure within an aircraft cabin, comprising regulating means movable to regulate the pressure in the cabin, control means operable to control said regulating means to maintain a desired pressure in the cabin, including pressure sensitive means, spring means exerting a force on said pressure sensitive means, and a member movable to change the setting of said spring means for varying the force exerted thereby on said pressure sensitive means, power means operable to effect movement of said member, and adjustable means settable to establish the rate at which said power means moves said member to vary the force of said spring means on said pressure sensitive means, for controlling the rate at which cabin pressure is altered by said regulating means.

15. In cabin pressure control mechanism, a pressure sensitive control element operable to control regulation of the cabin pressure, spring means exerting a force on said pressure sensitive element, adjusting means movable to alter the force exerted by said spring means on said pressure sensitive control element, motor means operable to drive said adjusting means for altering progressively the force exerted by said spring means, and settable means capable of being preset to control the rate at which said motor means drives said adjusting means.

16. Mechanism for controlling the pressure of air in an aircraft cabin, comprising pressure regulating means operable to control flow of air through the cabin, means sensitive to fluctuations in cabin pressure for controlling the operation of said pressure regulating means tending to maintain cabin pressure at a selected value and including absolute pressure responsive means responsive to a pressure related to cabin pressure, spring means exerting a force on said absolute pressure responsive means, motor means operable to adjust said spring means for varying the force exerted thereby on said absolute pressure responsive means so as to change the selected value of pressure maintained by said sensitive means and settable control means operable to control operation of said motor means and settable to effect predetermined operation thereof.

17. Mechanism for controlling the pressure of air in an aircraft cabin, comprising pressure regulating means operable to control flow of air through the cabin, servomotor means including a chamber and a pressure responsive element in said chamber and connected to said pressure regulating means for operating the same in response to changes in differential pressure on opposite sides of said element, a pilot valve providing for the controlled escape of air from said chamber at one side of said element to a region of lower pressure, absolute pressure responsive means in communication with the cabin and operable to control said pilot valve to maintain a selected pressure in said chamber, motor means operable to adjust said absolute pressure responsive means to control said pilot valve for establishing a different pressure in said chamber, and settable control means operable to control operation of said motor means and settable to effect predetermined operation thereof.

18. Mechanism for controlling the pressure of air within an aircraft cabin, comprising pressure regulating means operable to control flow of air through the cabin, servomotor means including a chamber and a pressure responsive element in said chamber and connected to said pressure regulating means for operating the same in response to changes in differential pressure on opposite sides of said element, the pressure acting against one side of said element being cabin pressure, means having a restricted aperture for limited bleeding of cabin air into said chamber at the other side of said element, a pilot valve for controlling the escape of air from said chamber at such other side of said element to a region of lower pressure, absolute pressure responsive means responsive to a pressure related to cabin pressure and operable to control said pilot valve, means operable to adjust said absolute pressure responsive means to control said pilot valve for maintaining a different pressure in said chamber and thereby change cabin pressure, motor means for automatically operating said adjusting means, and means controlling said motor means to effect operation thereof at a predetermined rate in changing the pressure within said chamber at such other side of said element.

19. Mechanism for controlling the pressure of air within an aircraft cabin, comprising pressure regulating means operable to control flow of air through the cabin, servomotor means including a chamber and a pressure responsive element in said chamber and connected to said pressure regulating means for operating the same in response to changes in differential pressure on opposite sides of said element, the pressure acting against one side of said element being cabin pressure, means having a restricted aperture for limited bleeding of cabin air into said chamber at the other side of said element, a pilot valve for controlling the escape of air from said chamber at such other side of said element to a region of lower pressure, absolute pressure responsive means responsive to a pressure related to cabin pressure and operable to control said pilot valve, means operable to adjust said absolute pressure responsive means to control said pilot valve for maintaining a different pressure in said chamber and thereby change cabin pressure, power means operable to actuate said adjusting means, selectively variable means operable to control the operation of said power means at various selected rates, means operable to select a different value of cabin pressure desired, means driven by said power means in synchronism with said adjusting means, and means cooperatively controlled by said cabin pressure selecting means and by said driven means and operable to terminate the operation of said power means when the cabin pressure reaches such different selected value.

20. Mechanism for regulating the pressure within an aircraft cabin, comprising pressure regulating means operable to control flow of air through the cabin, absolute pressure responsive means responsive to a pressure related to cabin pressure, means controlled by said absolute pressure responsive means and operable to control said pressure regulating means for maintaining the cabin pressure at a selected value, means operable to adjust said absolute pressure responsive means, an electric motor operatively connected to drive said adjusting means, switching means driven by said electric motor in synchronism with said adjusting means, a plurality of electric circuits selectively closable by said switching means and each corresponding to a different selected value of cabin pressure, manual switching means operable to select the one of said electric circuits corresponding to the different cabin pressure desired, and motor control means operable by energization of the one of said electric circuits selected by said manual switching means to interrupt operation of said electric motor for terminating movement of said adjusting means when the cabin pressure has reached such selected different desired value corresponding to the one of said circuits selected by said manual switching means, upon closing thereof by said driven switching means.

21. Mechanism for regulating the pressure within an aircraft cabin, comprising a valve operable to control the flow of air through the cabin, absolute pressure responsive means responsive to a pressure related to cabin pressure, means controlled by said absolute pressure responsive means and operable to move said valve to maintain the cabin pressure at a selected value, means operable to adjust said absolute pressure responsive means, a reversible electric motor operatively connected to drive said adjusting means, means operable to regulate the rate of operation of said adjusting means by said reversible motor, and means operable to interrupt operation of said electric motor when the cabin pressure has reached a predetermined value.

22. Mechanism for controlling the pressure of air in an aircraft cabin provided with airflow means for circulating air under pressure through the cabin, comprising valve means, means for operating said valve means so as to maintain a selected pressure in the cabin, absolute pressure responsive means for determining said selected pressure, motor means operable to actuate said absolute pressure responsive means to select a different pressure, selective control means operable to effect operation of said motor means at a predetermined speed to actuate said absolute pressure responsive means at a speed corresponding to that for which said selective control means are set, at which to maintain cabin pressure.

23. Mechanism for controlling the pressure of air in an aircraft cabin defined in claim 22, and means operable to control said motor means to establish the rate at which the absolute pressure responsive means is actuated by the control means in conforming to a new setting thereof.

24. Mechanism for regulating pressure within an aircraft cabin, comprising valve means closable to restrict outflow and thereby to raise cabin pressure above ambient atmospheric pressure, control means operable to exert a closing force on said valve means, power means operable to adjust said control means to increase the closing force on said valve means effected by said control means, energizing means operable to energize said power means and presettable in varying degrees to establish the extent of variation in force effected by said control means on said valve means, and deenergizing means operable to deenergize said power means when the force effected by said control means on said valve means has been varied to the degree for which said energizing means was preset.

25. Mechanism for regulating pressure within an aircraft cabin, comprising valve means closable to restrict outflow and thereby to raise cabin pressure above ambient atmospheric pressure, control means operable to exert a closing force on said valve means, power means operable to adjust said control means to increase the closing force on said valve means effected by said control means, energizing means operable to energize said power means and presettable in varying degrees to establish the extent of variation in force effected by said control means on said valve means, deenergizing means operable to deenergize said power means when the force effected by said control means on said valve means has been varied to the degree for which said energizing means was preset, and means operable to control said power means and presettable to establish the speed of movement thereof and consequently the rate of change in force exerted by said control means on said valve means.

JAMES B. COOPER.
ALFRED B. JEPSON.

REFERENCES CITED

The following references are of record in the file of this patent:

UNITED STATES PATENTS

| Number | Name | Date |
|---|---|---|
| 2,208,554 | Price | July 16, 1940 |
| 2,258,054 | Heidbrink | Oct. 7, 1941 |
| 2,332,639 | Hudson | Oct. 26, 1943 |
| 2,391,197 | Schwein | Dec. 18, 1945 |
| 2,424,491 | Morris | July 22, 1947 |
| 2,450,881 | Cooper et al. | Oct. 12, 1948 |
| 2,463,489 | Kemper | Mar. 1, 1949 |
| 2,463,490 | Kemper | Mar. 1, 1949 |
| 2,549,690 | Klemperer | Apr. 17, 1951 |

FOREIGN PATENTS

| Number | Country | Date |
|---|---|---|
| 521,623 | Great Britain | May 27, 1940 |